(12) United States Patent
Klein et al.

(10) Patent No.: US 8,981,724 B2
(45) Date of Patent: Mar. 17, 2015

(54) BATTERY PACK DISCHARGING DEVICE AND METHOD FOR DISCHARGING A BATTERY PACK

(71) Applicant: LG Chem, Ltd., Seoul (KR)

(72) Inventors: Martin J. Klein, Grosse Pointe Park, MI (US); Daniel K. McNeill, Lake Orion, MI (US); Mohamed Alamgir, Rochester Hills, MI (US); Gary Nivelt, Clarkston, MI (US)

(73) Assignee: LG Chem, Ltd., Seoul (KR)

( * ) Notice: Subject to any disclaimer, the term of this patent is extended or adjusted under 35 U.S.C. 154(b) by 216 days.

(21) Appl. No.: 13/827,830

(22) Filed: Mar. 14, 2013

(65) Prior Publication Data

US 2014/0266052 A1 Sep. 18, 2014

(51) Int. Cl.
*H02J 7/00* (2006.01)

(52) U.S. Cl.
CPC ................................ *H02J 7/0042* (2013.01)
USPC ........................................................ 320/127

(58) Field of Classification Search
USPC ........................................................ 320/127
See application file for complete search history.

(56) References Cited

U.S. PATENT DOCUMENTS

| | | | |
|---|---|---|---|
| 5,594,314 A | 1/1997 | Hagiuda et al. | |
| 2004/0257037 A1* | 12/2004 | Hartung et al. | 320/114 |
| 2009/0009132 A1* | 1/2009 | Dym | 320/127 |
| 2011/0074339 A1* | 3/2011 | Midorikawa | 320/106 |

FOREIGN PATENT DOCUMENTS

| | | |
|---|---|---|
| JP | 2012070577 A | 4/2012 |
| KR | 19970047107 U | 7/1997 |
| KR | 20060083133 A | 7/2006 |
| KR | 20090113521 A | 11/2009 |

OTHER PUBLICATIONS

U.S. Appl. No. 13/952,280, filed Jul. 26, 2013 entitled Battery Pack Discharging Device and Method for Discharging a Battery Pack.
Written Opinion for International application No. PCT/KR2014/002090 dated May 26, 2014.

* cited by examiner

*Primary Examiner* — Arun Williams
(74) *Attorney, Agent, or Firm* — Buckert Patent & Trademark Law Firm, PC; John F. Buckert

(57) ABSTRACT

A battery pack discharging device is provided. The device includes a hand-held member having a handle portion and first and second actuation members extending from the handle portion. The device further includes a docking device having a housing, first and second switches, and a resistor. The housing has first and second apertures extending therethrough. First and second actuation members of the hand-held member are disposed in first and second apertures, respectively, of the housing such that the first and second actuation members transition the first and second switches, respectively, to first and second closed operational positions, respectively, to discharge the battery pack.

17 Claims, 16 Drawing Sheets

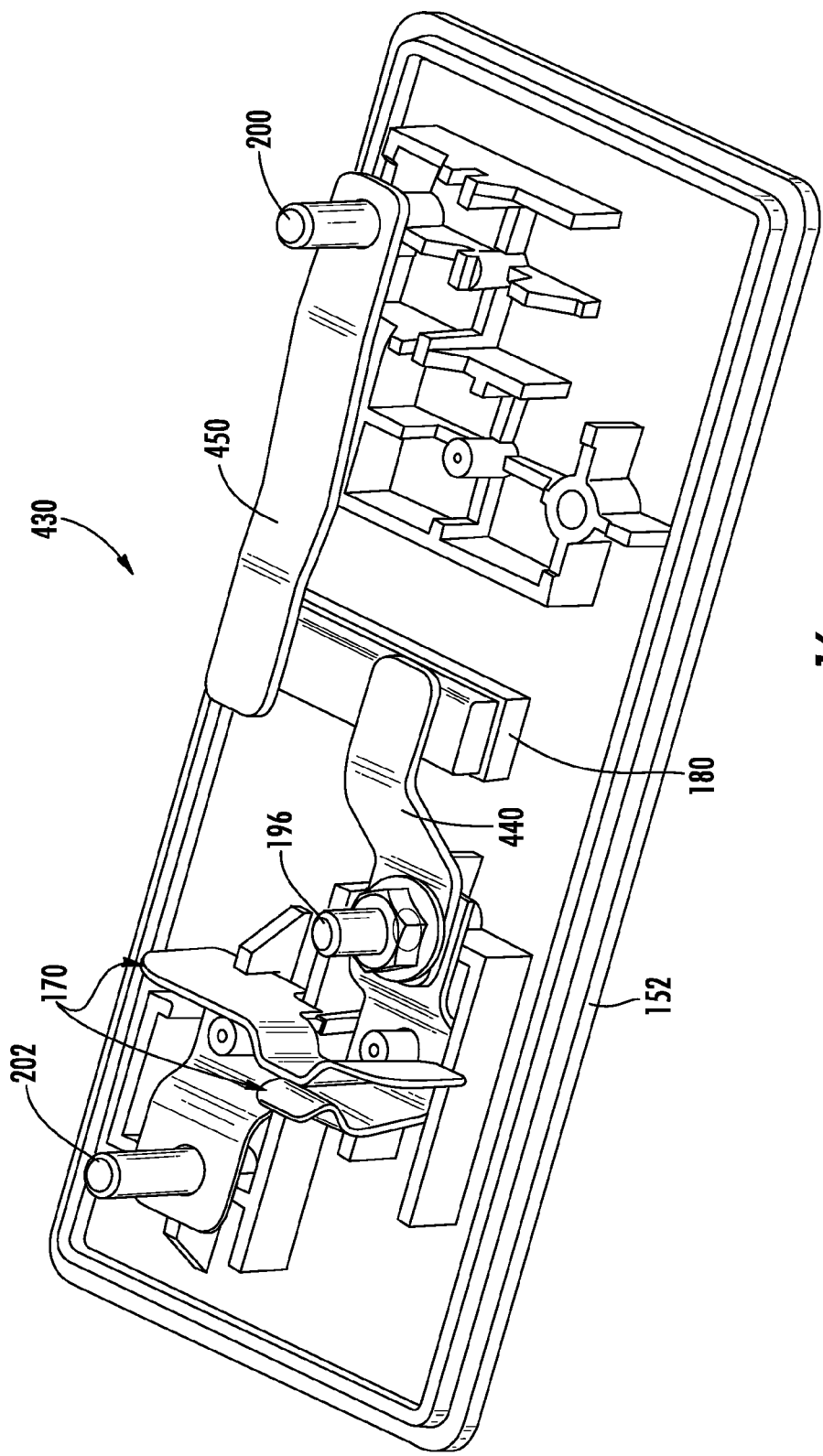

BATTERY PACK DISCHARGING DEVICE AND METHOD FOR DISCHARGING A BATTERY PACK

BACKGROUND

Emergency responders may have to assist drivers in electric vehicles or hybrid electric vehicles, hereinafter referred to as electric vehicles. The inventors herein have recognized that it would be advantageous to have a battery pack discharging device that can be utilized by an emergency responder to safely discharge a battery pack in the electric vehicle or the hybrid electric vehicle.

SUMMARY

A battery pack discharging device for discharging a battery pack in accordance with an exemplary embodiment. The battery pack discharging device includes a hand-held member having a handle portion and an actuation member extending from the handle portion. The battery pack discharging device further including a docking device having a housing, a switch, and a resistor. The housing has an aperture extending therethrough. The switch is disposed in the housing proximate to the aperture. The switch has a normally-open operational position. The resistor is electrically coupled to the switch. The switch is further configured to be electrically coupled to the battery pack. The actuation member of the hand-held member is configured to be disposed in the aperture of the housing of the docking device such that the actuation member transitions the switch to a closed operational position A battery pack discharging device for discharging a battery pack in accordance with an exemplary embodiment is provided. The battery pack discharging device includes a handheld member having a handle portion and first and second actuation members extending from the handle portion. The battery pack discharging device further includes a docking device having a housing, first and second switches, and a resistor. The housing has first and second apertures extending therethrough. The first and second switches are disposed in the housing proximate to the first and second apertures, respectively. The first and second switches each have a normally-open operational position. The resistor is electrically coupled between the first and second switches. The first and second switches are further configured to be electrically coupled to the battery pack. The first and second actuation members of the hand-held member are configured to be disposed in the first and second apertures, respectively, of the housing of the docking device such that the first and second actuation members transition the first and second switches, respectively, to first and second closed operational positions, respectively.

A method for discharging a battery pack in accordance with another exemplary embodiment is provided. The method includes providing a battery pack discharging device having a hand-held member and a docking device. The handheld member has a handle portion and first and second actuation members extending from the handle portion. The docking device has a housing, first and second switches, and a resistor. The housing has first and second apertures extending therethrough. The first and second switches are disposed in the housing proximate to the first and second apertures, respectively. The first and second switches each have a normally-open operational position. The resistor is electrically coupled between the first and second switches. The first and second switches are further configured to be electrically coupled to the battery pack. The method further includes disposing the first and second actuation members of the handheld member in the first and second apertures, respectively, of the housing of the docking device such that the first and second actuation members transition the first and second switches, respectively, to first and second closed operational positions, respectively.

BRIEF DESCRIPTION OF THE DRAWINGS

FIG. 16 is a schematic of a portion of another battery pack discharging device in accordance with another exemplary embodiment.

DETAILED DESCRIPTION

Figure 1:
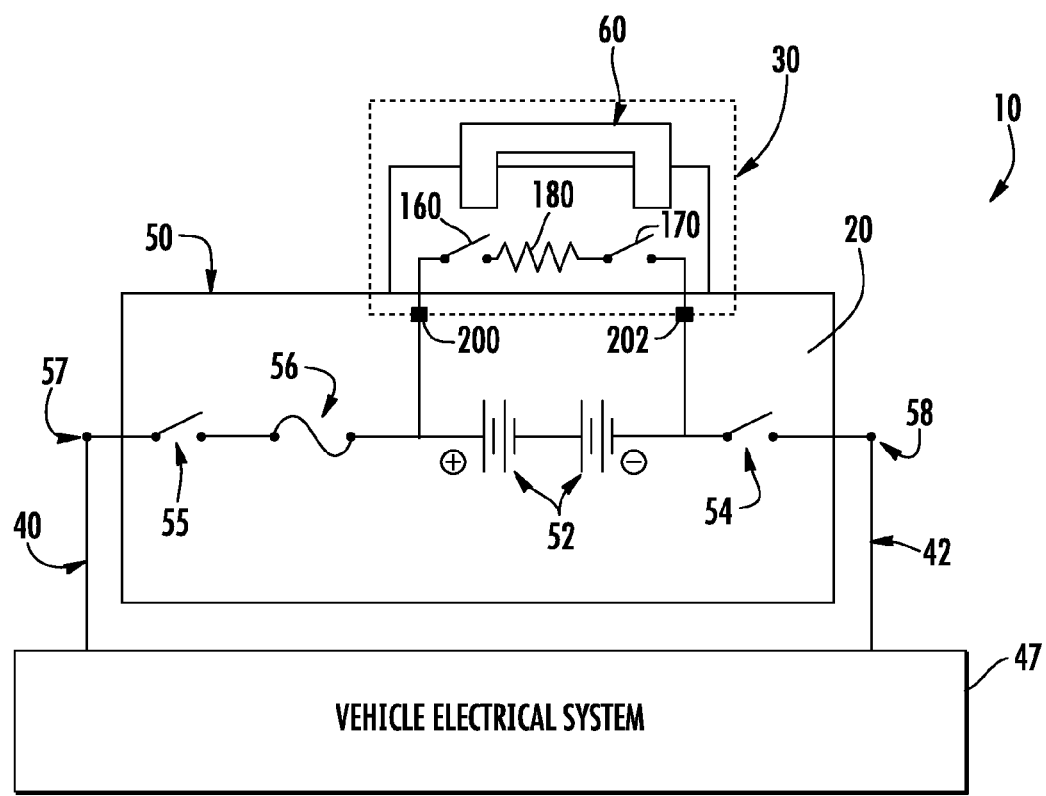
FIG. 1 is a schematic of an electric vehicle having a battery pack and a battery pack discharging device in accordance with an exemplary embodiment.

Referring to FIG. 1, an electric vehicle 10 is illustrated. The electric vehicle 10 includes a battery pack 20, a battery pack discharging device 30 in accordance with an exemplary embodiment, and electrical cables 40, 42.

The battery pack 20 is provided to store and release electrical energy for the hybrid electric vehicle 10. The battery pack 20 includes a housing 50, battery modules 52, a positive voltage terminal 57, and a negative voltage terminal 58. In an exemplary embodiment, the battery pack 20 further includes a negative main contactor 54, a positive main contactor 55, and a main fuse 56. The battery modules 52 are disposed within the housing 50. The battery module 52 includes a positive voltage terminal and a negative voltage terminal. The positive terminal of the battery module 52 is electrically coupled to the positive voltage terminal 57 of the battery pack 20 when the positive contactor 55 has a closed operational position and fuse 56 is installed and functional. The negative terminal of the battery module 52 is electrically coupled to the negative voltage terminal 58 of the battery pack 20 when the negative contactor 54 has a closed operational position. In one exemplary embodiment, the battery module 52 are lithium-ion battery modules. Of course, in an alternative embodiment, the battery module 52 could be other types of battery modules or ultra-capacitors known to those skilled in the art. The positive voltage terminal 57 is electrically coupled to the vehicle electrical system 47 utilizing the electrical cable 40, and the negative voltage terminal 58 is electrically coupled to the vehicle electrical system 47 utilizing the electrical cable 42

An advantage of the battery pack discharging device 30 is that the device 30 allows an operator to electrically discharge the battery pack 20 utilizing a single hand-held member 60 regardless of the status of the contactors 54, 55 and fuse 56.

The battery pack discharging device 30 is provided to selectively discharge the battery pack 20. The battery pack discharging device 30 includes a hand-held member 60 and a docking device 70. The device 30 is electrically coupled to the positive and negative terminals of the battery modules 52 and electrically discharges the battery pack 20 when the hand-held member 60 is operably coupled to the docking device 70.

Figure 2:
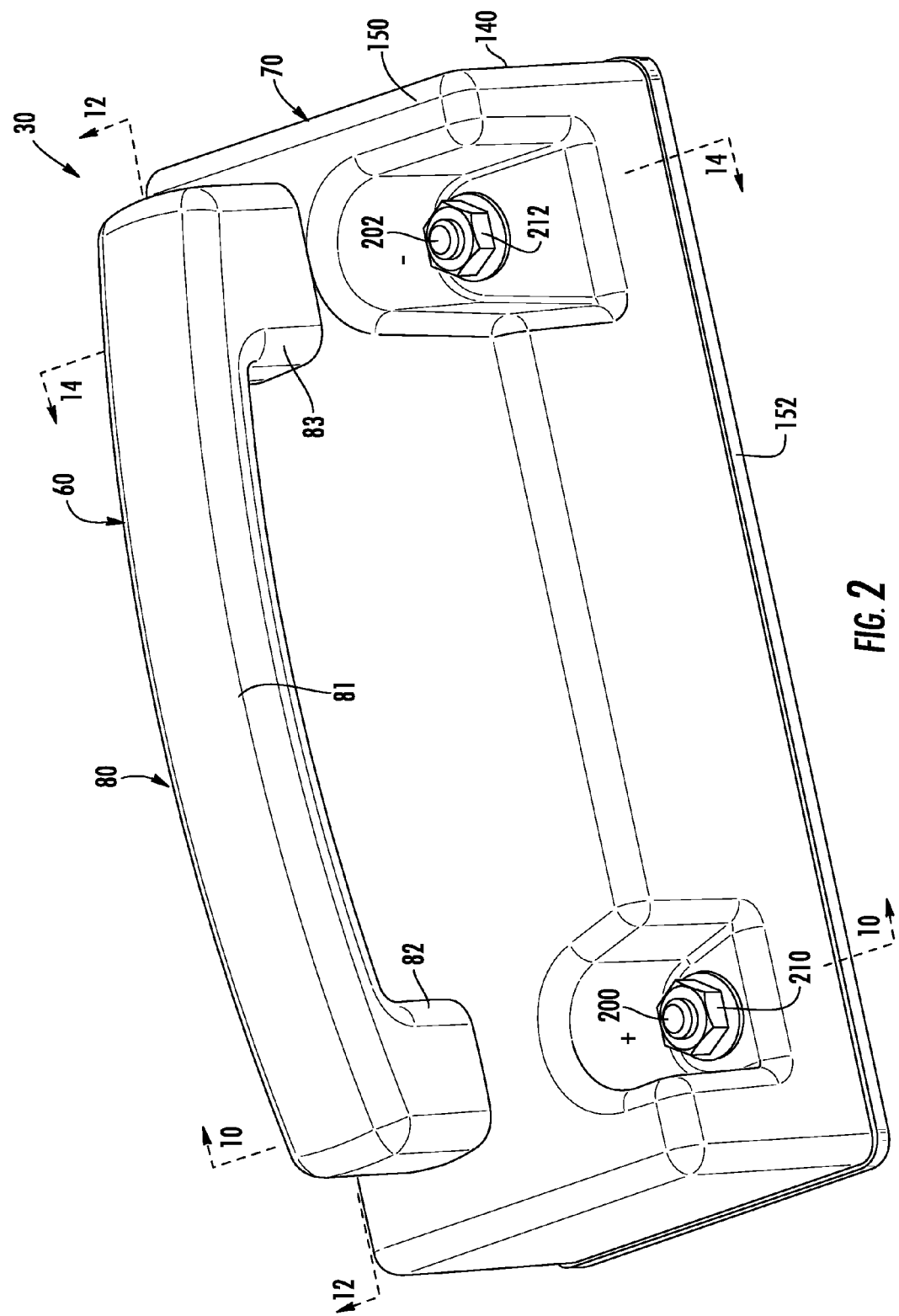
FIG. 2 is a schematic of the battery pack discharging device of FIG. 1 having a docking device and a hand-held member.
Figure 3:
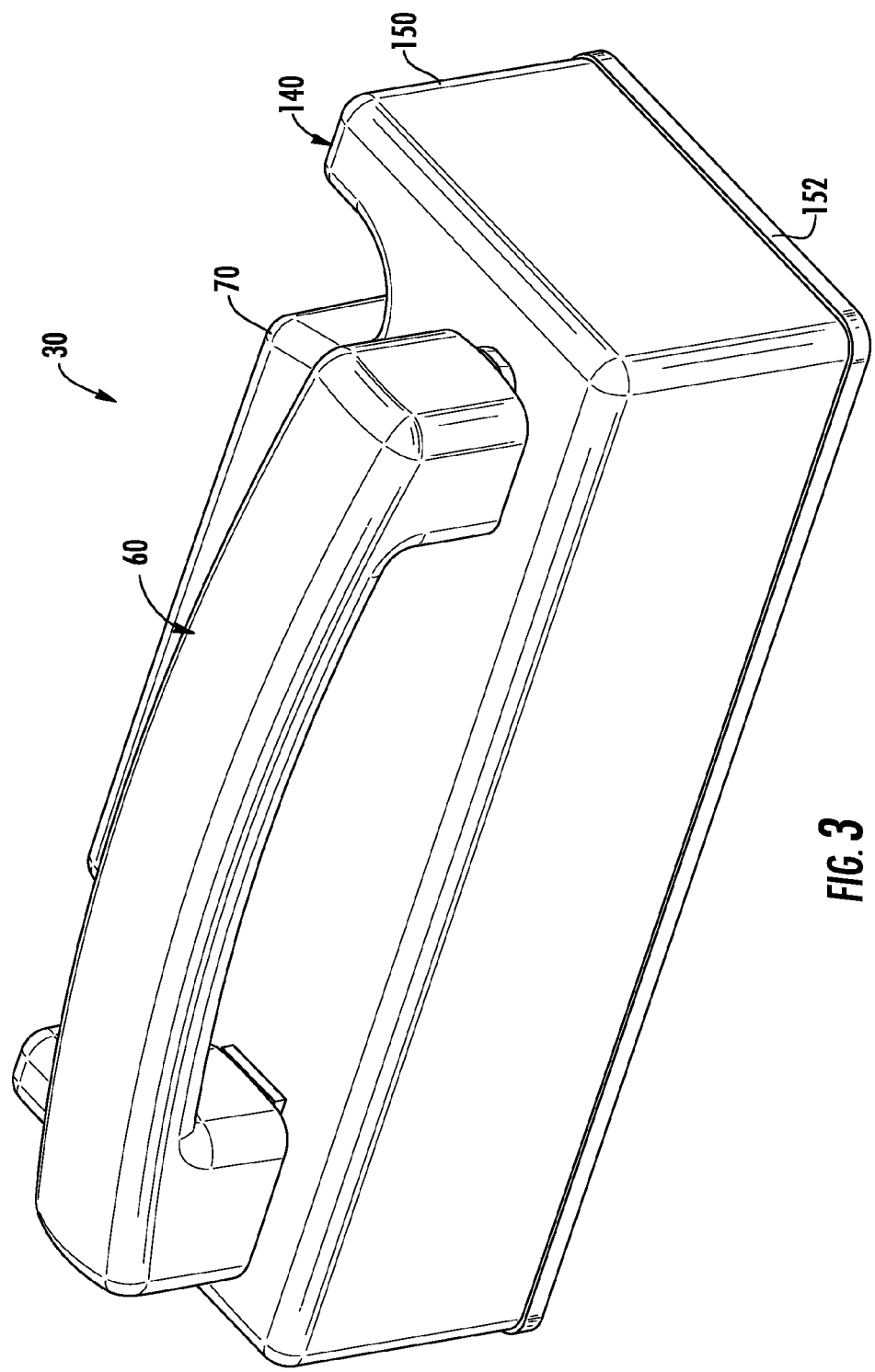
FIG. 3 is another schematic of the battery pack discharging device of FIG. 1.
Figure 4:
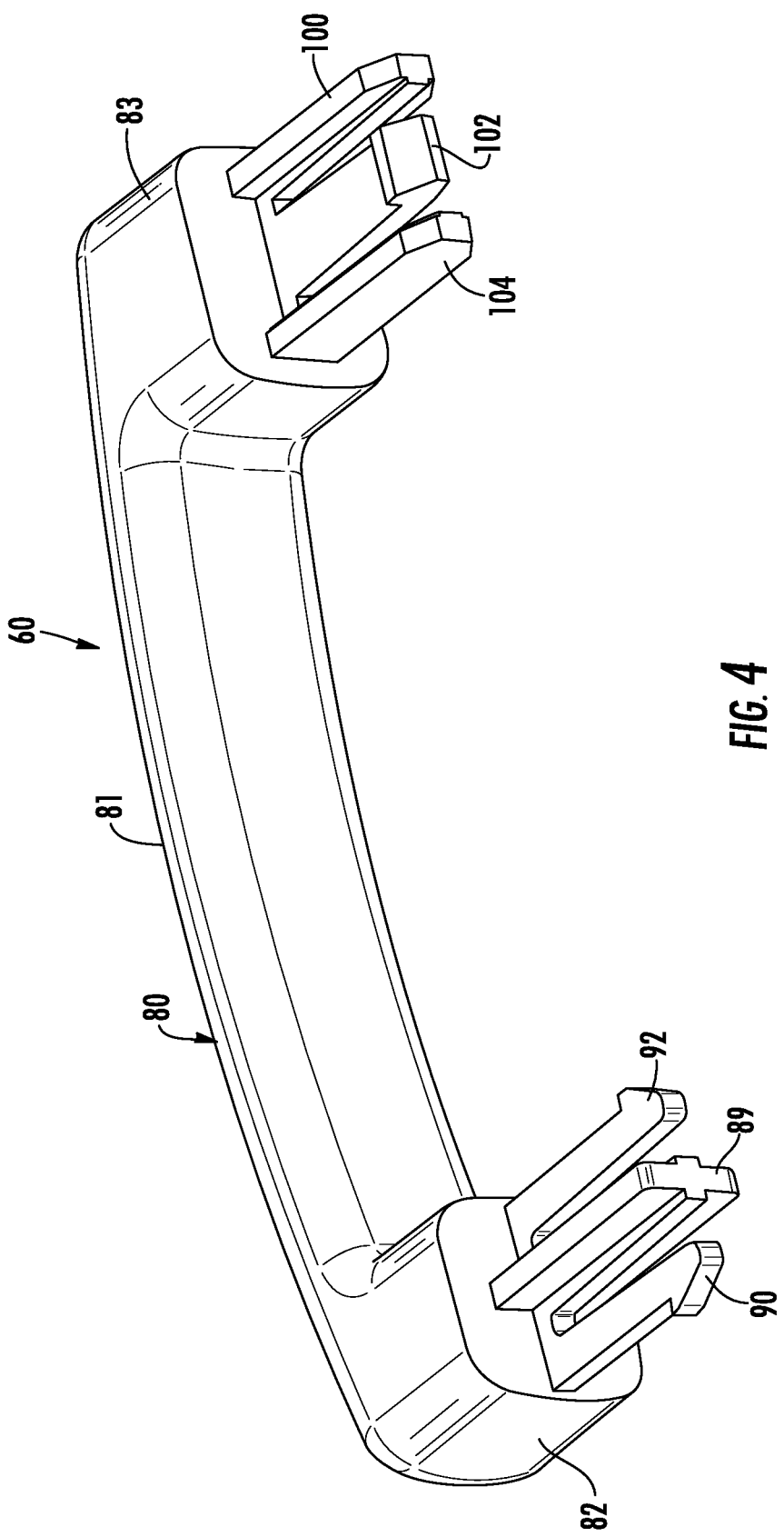
FIG. 4 is a schematic of the hand-held member of FIG. 2.
Figure 5:
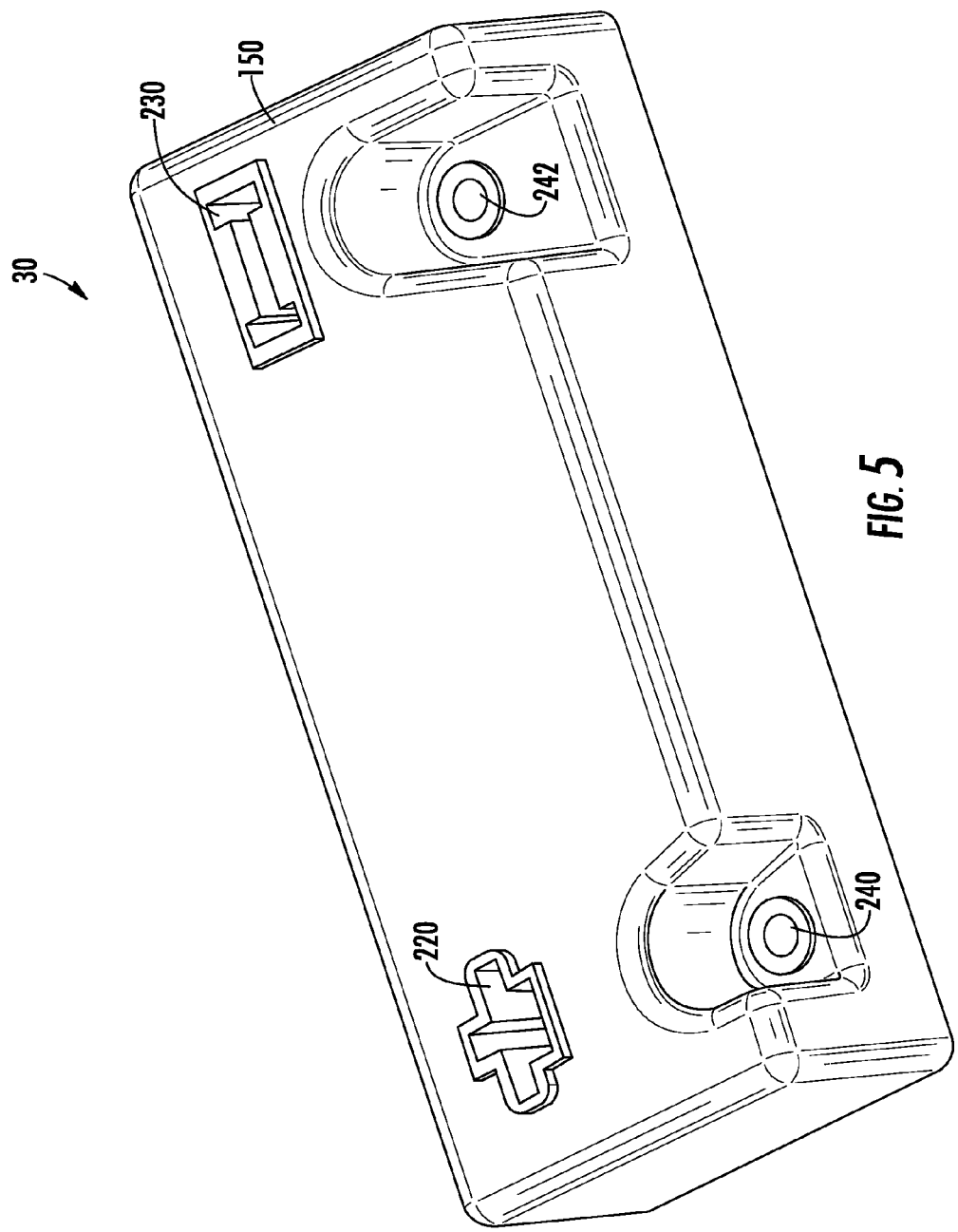
FIG. 5 is a schematic of a housing of the docking device of FIG. 2.

Referring to FIGS. 2-4, the hand-held member 60 is configured to be operably coupled to the docking device 70. In one exemplary embodiment, the hand-held member 60 is constructed of an electrically non-conductive material such as plastic for example. Of course, in alternative embodiments, the hand-held member 60 could be constructed of other electrically non-conductive materials known to those skilled in the art. The hand-held member 60 includes a handle portion 80 having a central body 81 and end portions 82, 83 disposed at opposite ends of the central body 81. The hand-held member 60 further includes an actuation member 89 and latching tabs 90, 92 extending in a first direction from the end portion 82. Further, the hand-held member 60 includes an actuation member 104, a latching tab 102, and a guide member 100 extending from the end portion 83.

Referring to FIGS. 1, 2, 4 and 6, the actuation member 89 is configured to induce the normally-open switch 160 to have a closed operational position when the hand-held member 60 is operably coupled to the docking station 70 and the actuation member 89 is disposed in the aperture 220 of the housing 140 as will be explained in greater detail below.

Figure 6:
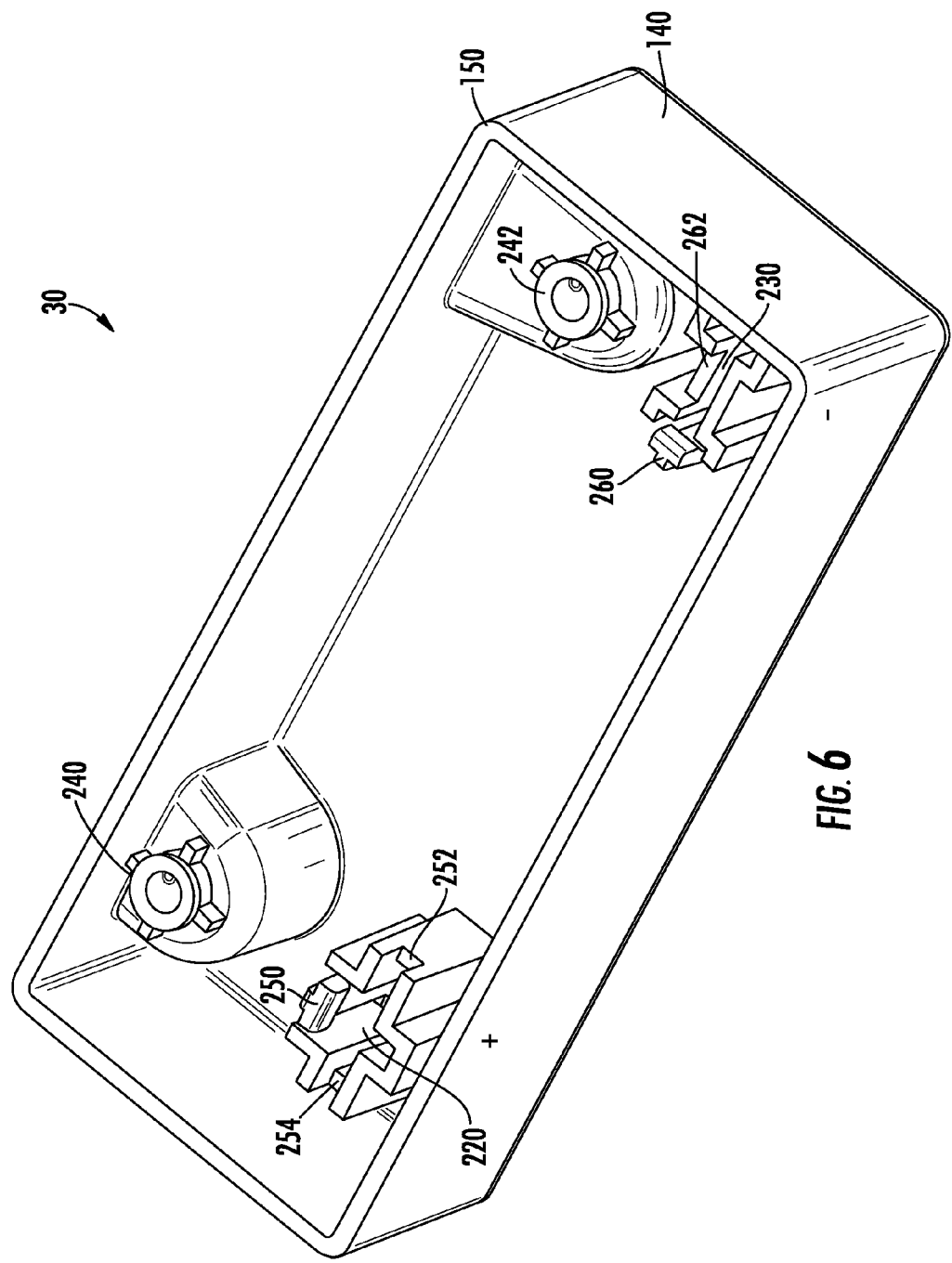
FIG. 6 is another schematic of the housing of FIG. 5.

Referring to FIGS. 4 and 6, the latching tabs 90, 92 are disposed proximate to first and second sides of the actuation member 89. The latching tabs 90, 92 are configured to engage catching portions 254, 252, respectively of the housing 140 of the docking device 70 when the actuation member 89 is disposed in the aperture 220 of the housing 140 to prevent the actuation member 89 from being removed from the aperture 220.

Referring to FIGS. 1, 2, 4 and 6, the actuation member 104 is configured to induce the normally-open switch 170 to have a closed operational position when the hand-held member 60 is operably coupled to the docking station 70 and the actuation member 104 is disposed in the aperture 230 of the housing 140 as will be explained in greater detail below.

Referring to FIGS. 4 and 6, the latching tab 102 is disposed between the actuation member 104 and the guide member 100. The latching tab 102 is configured to engage a catching portion 262 of the housing 140 of the docking device 70 when the actuation member 104 is disposed in the aperture 230 of the housing 140 to prevent the actuation member 104 from being removed from the aperture 230. The guide member 100 is configured to assist an operator to guide the actuation member 104 to a desired operational position within the aperture 230.

Referring to FIGS. 2, 7-9, the docking device 70 is configured to operably receive the hand-held member 60 therein. The docking device 70 includes a housing 140 having a housing portion 150 and a base plate 152. The docking device 70 further includes switches 160, 170, a resistor 180, conductive plates 190, 192, conductive studs 194, 196, electrical terminals 200, 202, and nuts 204, 206, 210, 212. In one exemplary embodiment, the housing portion 150 and the base plate 152 are constructed of electrically non-conductive material such as plastic for example. Of course, in alternative embodiments, the housing portion 150 and the base plate 152 could be constructed of other electrically non-conductive materials known to those skilled in the art.

Referring to FIGS. 5, 6 and 10-13, the housing portion 150 is configured to be disposed over the base plate 152 and the coupled to the base plate 152. The housing portion 150 includes apertures 220, 230 extending therethrough. The aperture 220 has a first cross-sectional shape (shown in FIG. 5), and the aperture 230 has a second cross-sectional shape (shown in FIG. 5) which is different than the first cross-sectional shape. For example, in one exemplary embodiment, the aperture 220 has a plus-sign cross-sectional shape, and the aperture 230 has a minus-sign cross-sectional shape. During attachment of the hand-held member 60 to the docking device 70, the actuation member 89 and the latching tabs 90, 92 are configured to be disposed through the aperture 220 having the first cross-sectional shape. However, actuation member 89 and the latching tabs 90, 92 cannot be disposed through the aperture 230 having the second cross-sectional shape to contact a movable electrically non-conductive tab. Further, during attachment of the hand-held member 60 to the docking device 70, the actuation member 104, the latching tab 102, and the guide member 100 are configured to be disposed through the aperture 230 having the second cross-sectional shape. However, the actuation member 104, the latching tab 102, and the guide member 100 cannot be disposed through the aperture 220 having the first cross-sectional shape to contact a movable electrically non-conductive tab. In an alternative embodiment, the apertures 220, 230 have an identical shaped to one another.

Figure 7:
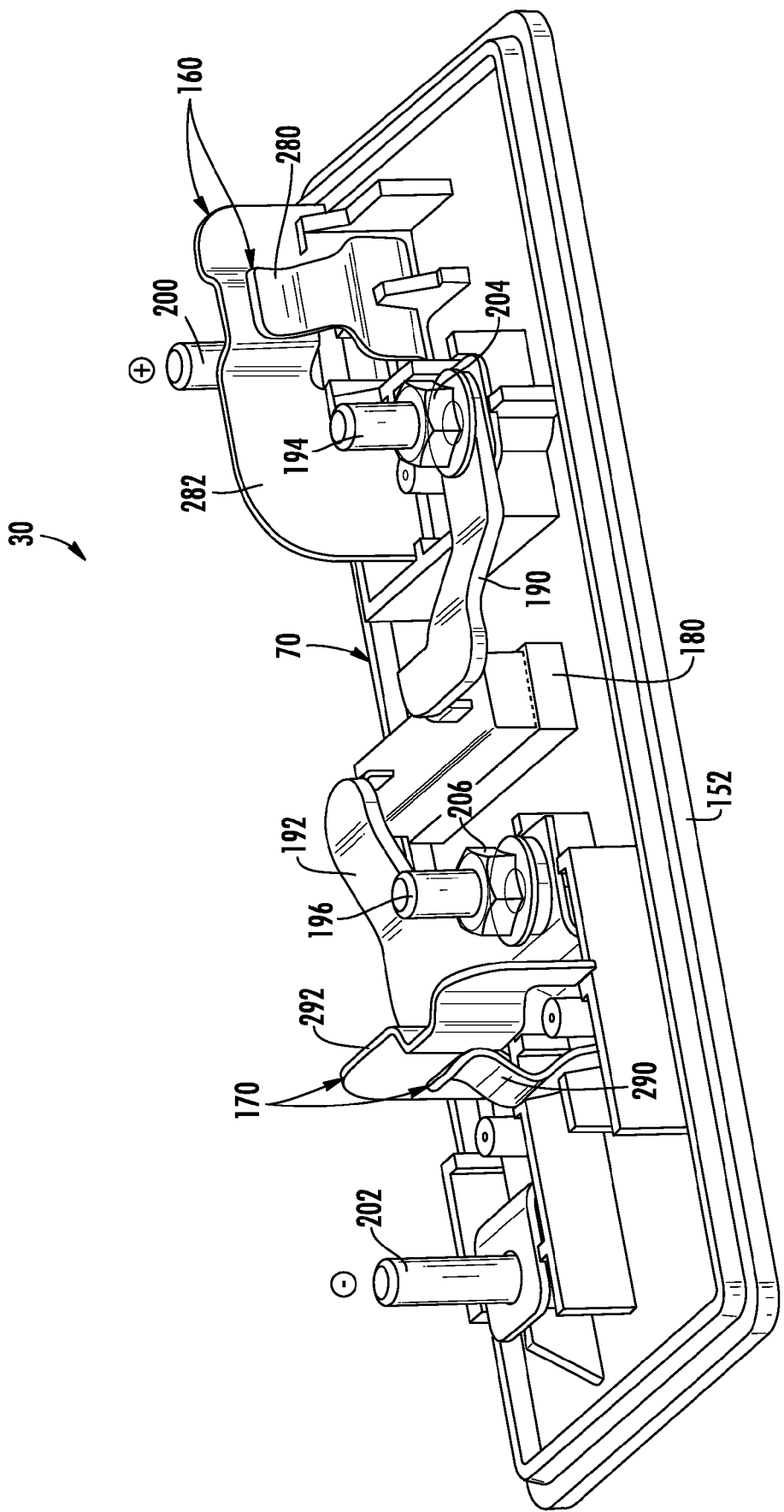
FIG. 7 is a schematic of a base plate and electrical components utilized in the docking device of FIG. 2.
Figure 8:
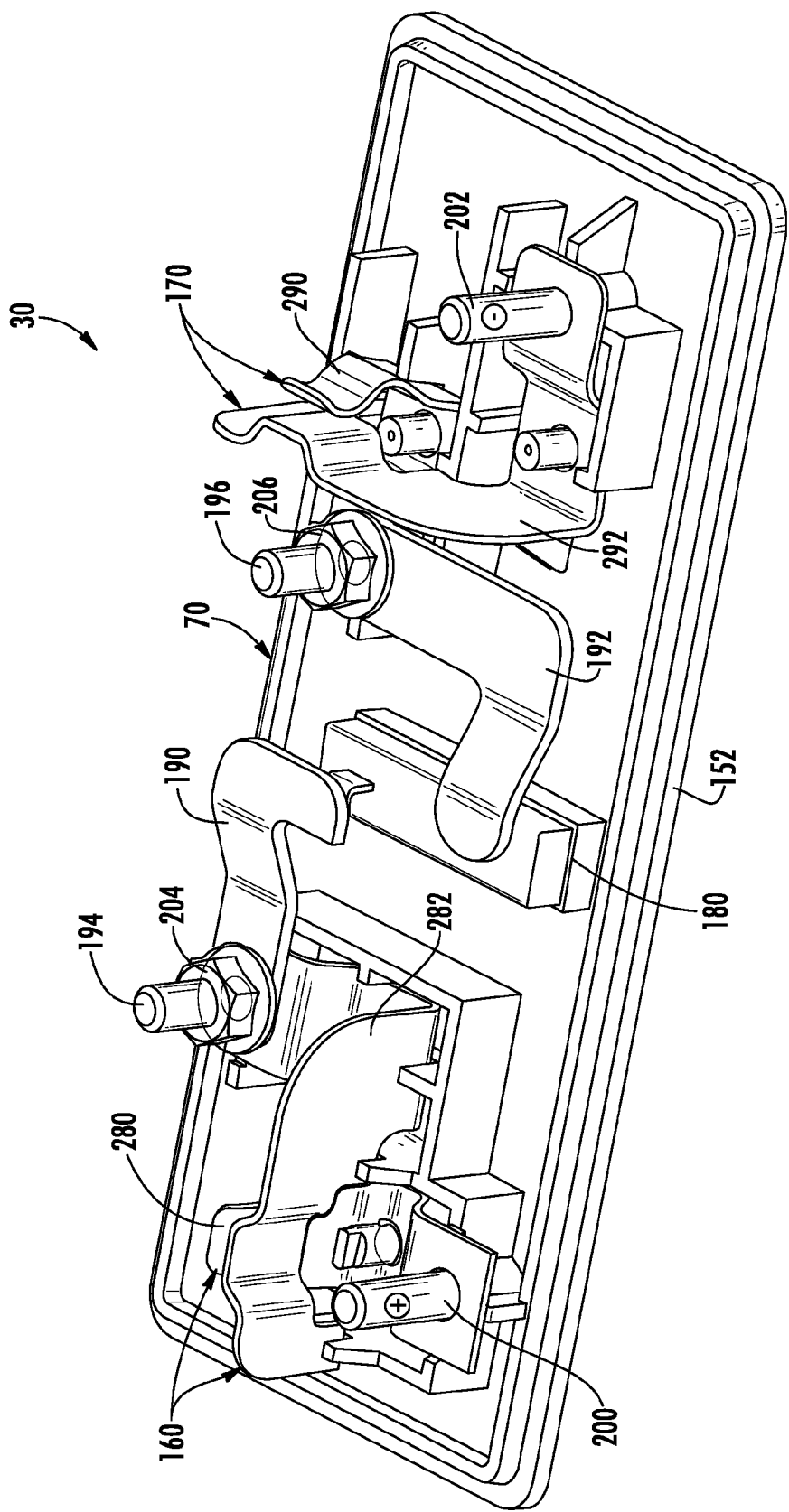
FIG. 8 is another schematic of the base plate and electrical components of FIG. 7.
Figure 9:
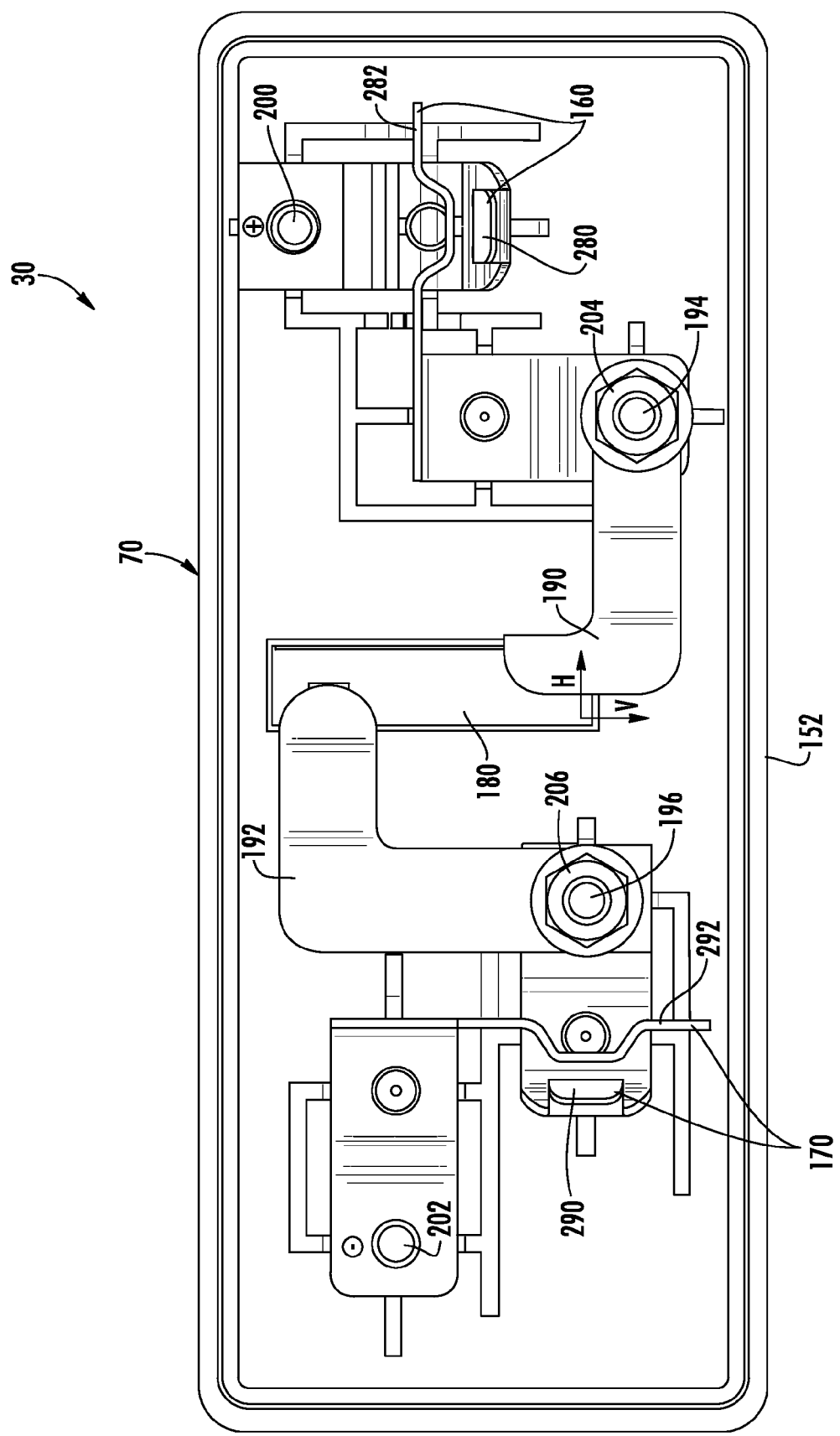
FIG. 9 is another schematic of the base plate and electrical components of FIG. 7.

Referring to FIGS. 2, 6 and 7, the housing portion 150 further includes apertures 240, 242 extending therethrough for receiving the electrical terminals 200, 202 therethrough.

Referring to FIG. 6, the housing portion 150 further includes the movable electrically non-conductive tab 250, catching portions 252, 254, the movable electrically non-conductive tab 260, and a catching portion 262.

Referring to FIGS. 4, 6 and 7, the movable electrically non-conductive tab 250 is disposed proximate to the aperture 220. The tab 250 is configured to electrically isolate the switch 160 from the hand-held member 60 when the hand-held member 60 is operably coupled to the docking device 70. The catching portions 252, 254 are disposed on opposite sides of the aperture 220 and are configured to engage the latching tabs 90, 92, respectively.

Figure 14:
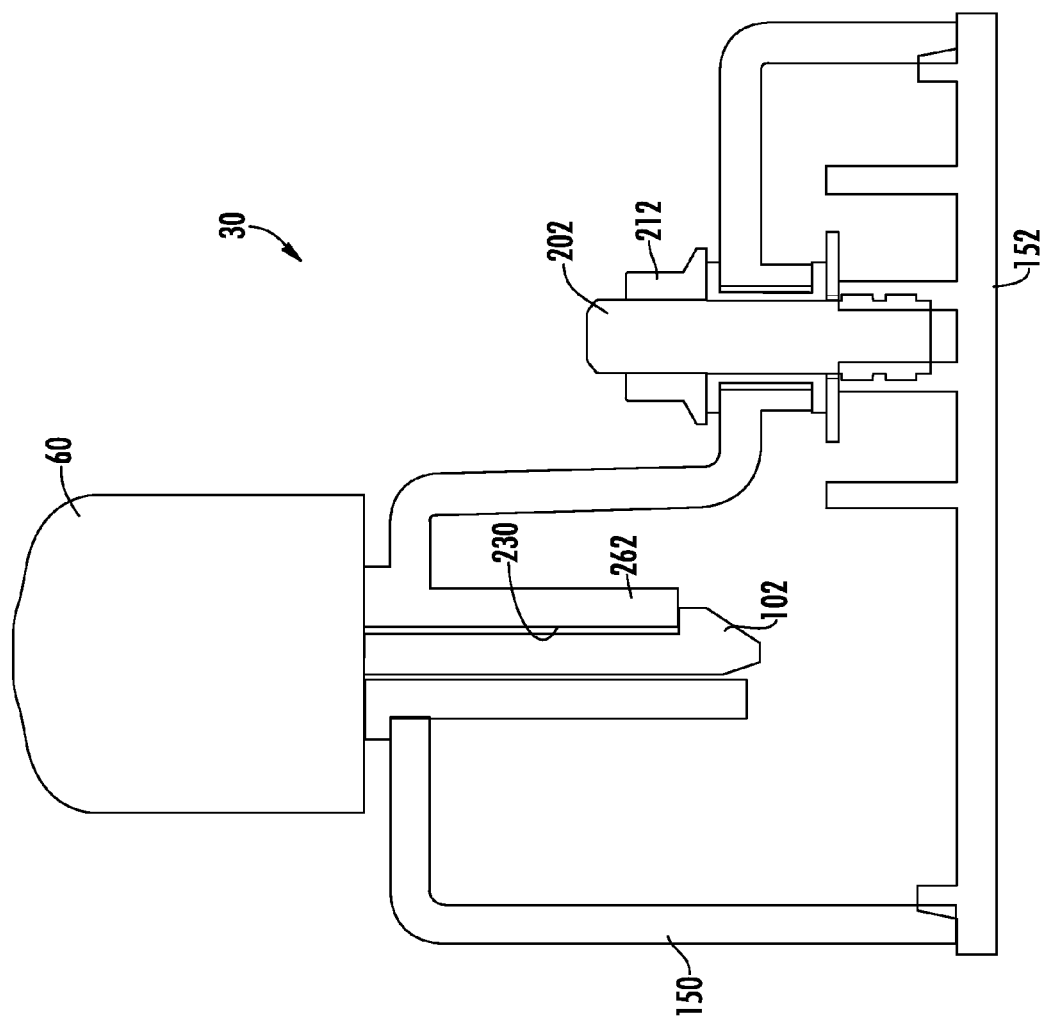
FIG. 14 is a cross-sectional schematic of the docking device of FIG. 2 taken along lines 14-14 in FIG. 2.

Referring to FIGS. 7 and 14, the movable electrically non-conductive tab 260 is disposed proximate to the aperture 230. The tab 260 is configured to electrically isolate the switch 170 from the hand-held member 60 when the hand-held member 60 is operably coupled to the docking device 70. The catching portion 262 is disposed proximate to the aperture 230 and is configured to engage the latching tab 102.

Figure 10:
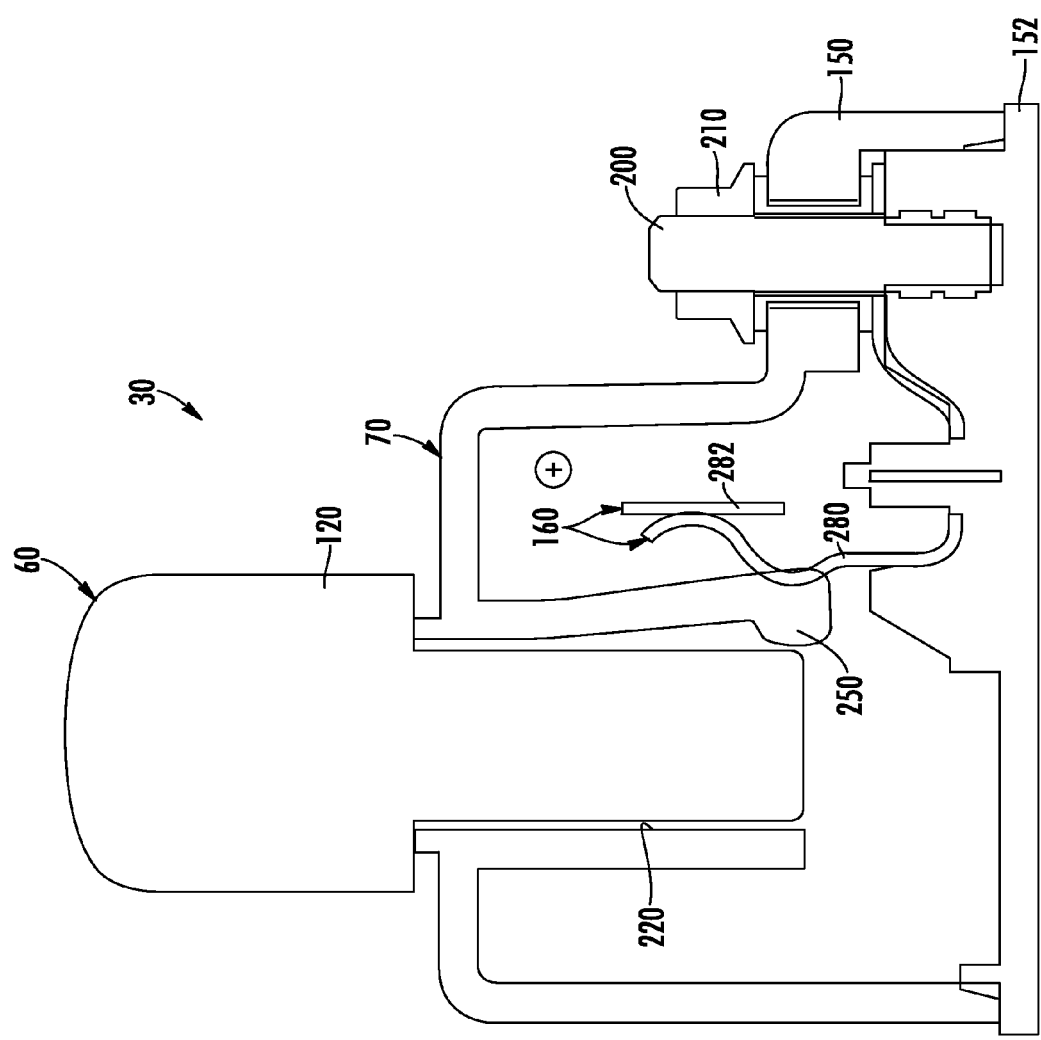
FIG. 10 is a cross-sectional schematic of the battery pack discharging device of FIG. 2 taken along lines 10-10 in FIG. 2.
Figure 11:
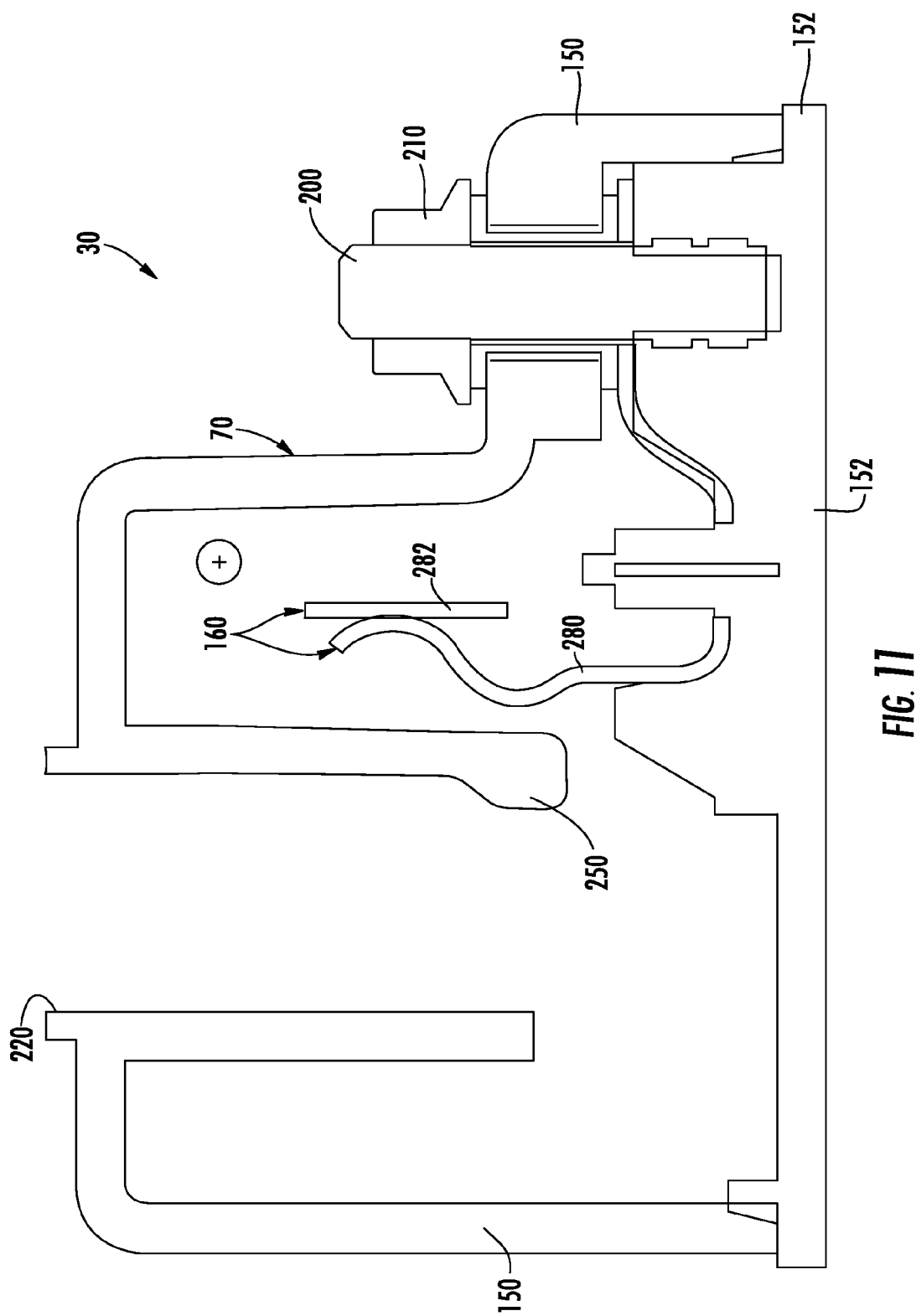
FIG. 11 is a cross-sectional schematic of the docking device of FIG. 2 when the hand-held member is not coupled to the docking device.

Referring to FIGS. 7-11, the switch 160 is a normally-open switch. The switch 160 includes a movable contact member 280 and a stationary contact member 282. The movable contact member 280 and the stationary contact member 282 are disposed proximate to one another and to the aperture 220 and are coupled to the base plate 152. Referring to FIG. 11, the movable contact member 280 has a first operational position in which the movable contact member 280 is not physically contacting the stationary contact member 282. Referring to FIG. 10, the movable contact member 280 has a second operational position in which the movable contact member 280 is physically contacting the stationary contact member 282 when the actuation member 89 (shown in FIG. 4) is disposed in the aperture 220 (shown in FIG. 6) such that the movable electrically non-conductive tab 250 moves the movable contact member 280 from the first operational position to the second operational position thereof to transition the switch 160 to the first closed operational position.

Figure 12:
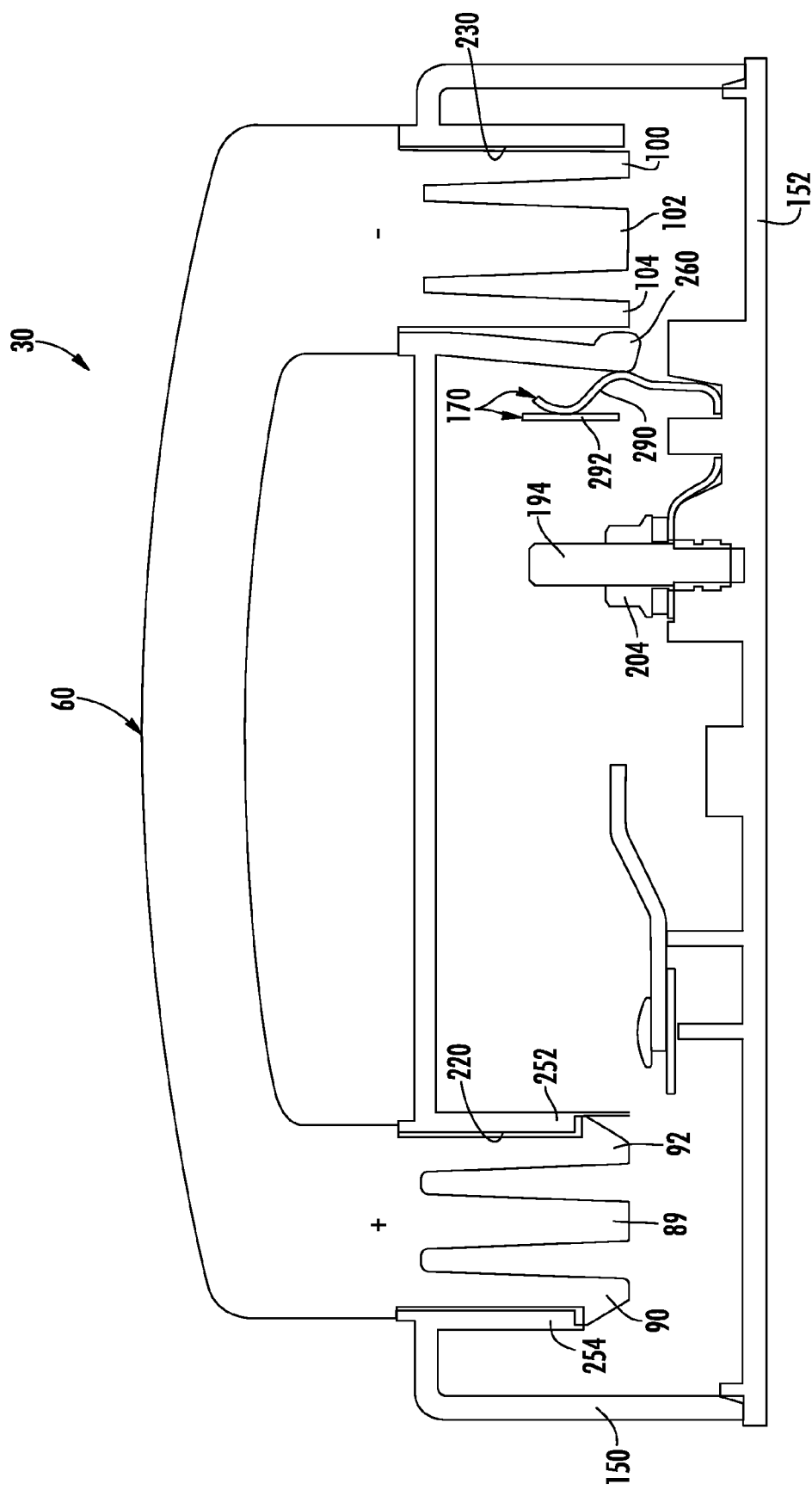
FIG. 12 is a cross-sectional schematic of the docking device of FIG. 2 taken along lines 12-12 in FIG. 2.
Figure 13:
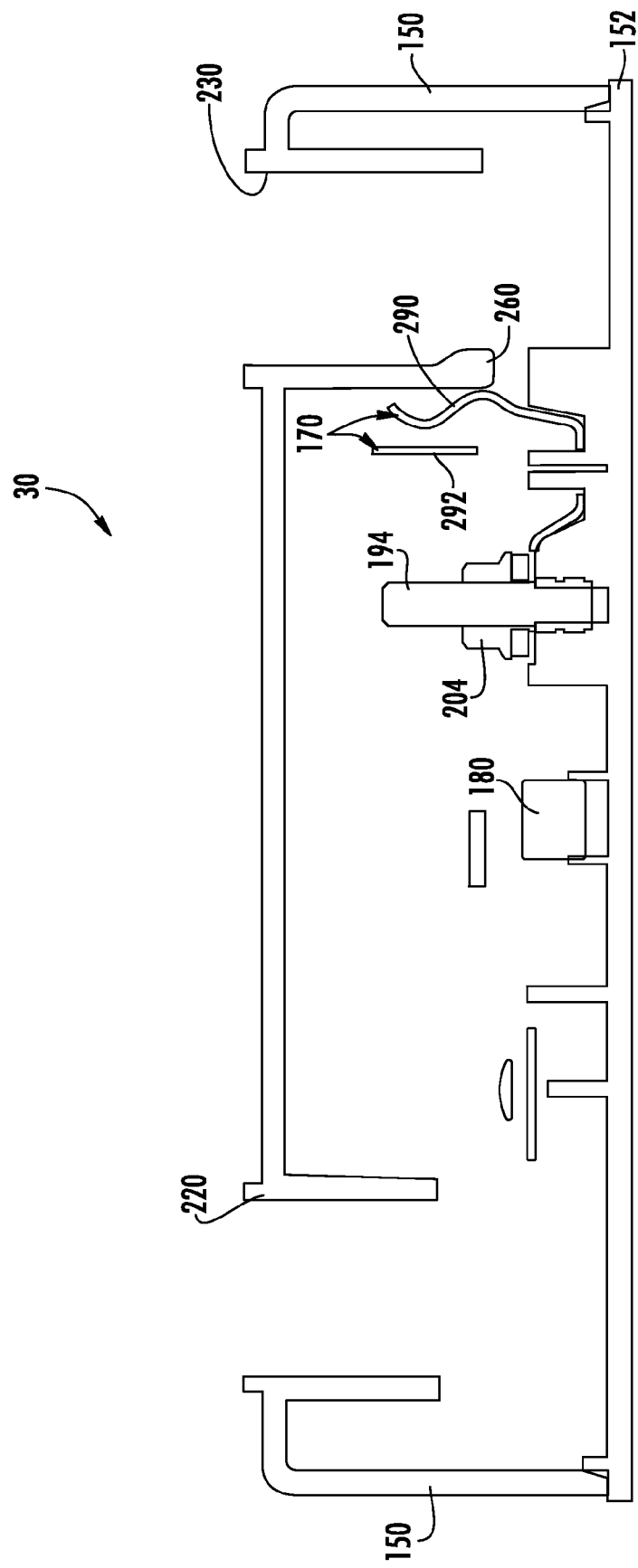
FIG. 13 is a cross-sectional schematic of the docking device of FIG. 2 when the hand-held member is not coupled to the docking device.

Referring to FIGS. 7-11, the switch 170 is a normally-open switch. The switch 170 includes a movable contact member 290 and a stationary contact member 292. The movable contact member 290 and the stationary contact member 292 are disposed proximate to one another and to the aperture 230 (shown in FIG. 6) and are coupled to the base plate 152. Referring to FIG. 13, the movable contact member 290 has a first operational position in which the movable contact member 290 is not physically contacting the stationary contact member 292. Referring to FIG. 12, the movable contact member 290 has a second operational position in which the movable contact member 290 is physically contacting the stationary contact member 292 when the actuation member 104 (shown in FIG. 4) is disposed in the aperture 230 (shown in FIG. 6) such that the movable electrically non-conductive tab 260 moves the movable contact member 290 from the first operational position to the second operational position thereof to transition the switch 170 to the first closed operational position.

Referring to FIGS. 1 and 7-9, the resistor 180 is configured to dissipate electrical energy from the battery pack 20 when the switches 160, 170 have a closed operational position. In one exemplary embodiment, the resistor 180 is coupled to the base plate 152. A first side of the resistor 180 is electrically coupled to the stationary contact member 282 utilizing the conductive plate 190. A second side of the resistor 180 is electrically coupled to the stationary contact member 292 utilizing the conductive plate 192. In an alternative embodiment, the resistor 180 could be disposed outside of the housing 140 and could comprise a resistor bank having a plurality of resistors coupled together either in series or in parallel to one another. Further, the resistance value of the resistor 180 could be determined based on a maximum output voltage of the battery pack 20 and a maximum desired electrical current to be received by the battery pack discharging device 30 from the battery pack 20. In one exemplary embodiment, the conductive plates 192 are constructed of copper.

The conductive studs 194, 196 are coupled to the base plate 152. The conductive stud 194 extends through an aperture in the conductive plate 190 and through an aperture in the stationary contact member 282. A nut 204 is threadably disposed on an end of the conductive stud 194 to fixedly attach the conductive plate 190 to the stationary contact member 282.

The conductive stud 196 extends through an aperture in the conductive plate 192 and an aperture in the stationary contact member 292. A nut 206 is threadably disposed on an end of the conductive stud 196 to fixedly attach the conductive plate 192 to the stationary contact member 292.

Referring to FIGS. 2 and 7-9, the electrical terminals 200, 202 are coupled to the base plate 152. The electrical terminal 200 extends through an aperture in the stationary contact member 282 and is electrically coupled to the stationary contact member 282. The electrical terminal 200 threadably receives a nut 210 thereon for coupling the electrical terminal 200 to the cable 40 (shown in FIG. 1). The electrical terminal 202 extends through an aperture in the stationary contact member 292 and is electrically coupled to the stationary contact member 292. The electrical terminal 202 threadably receives a nut 212 thereon for coupling the electrical terminal 202 to the cable 42 (shown in FIG. 1).

Figure 15:
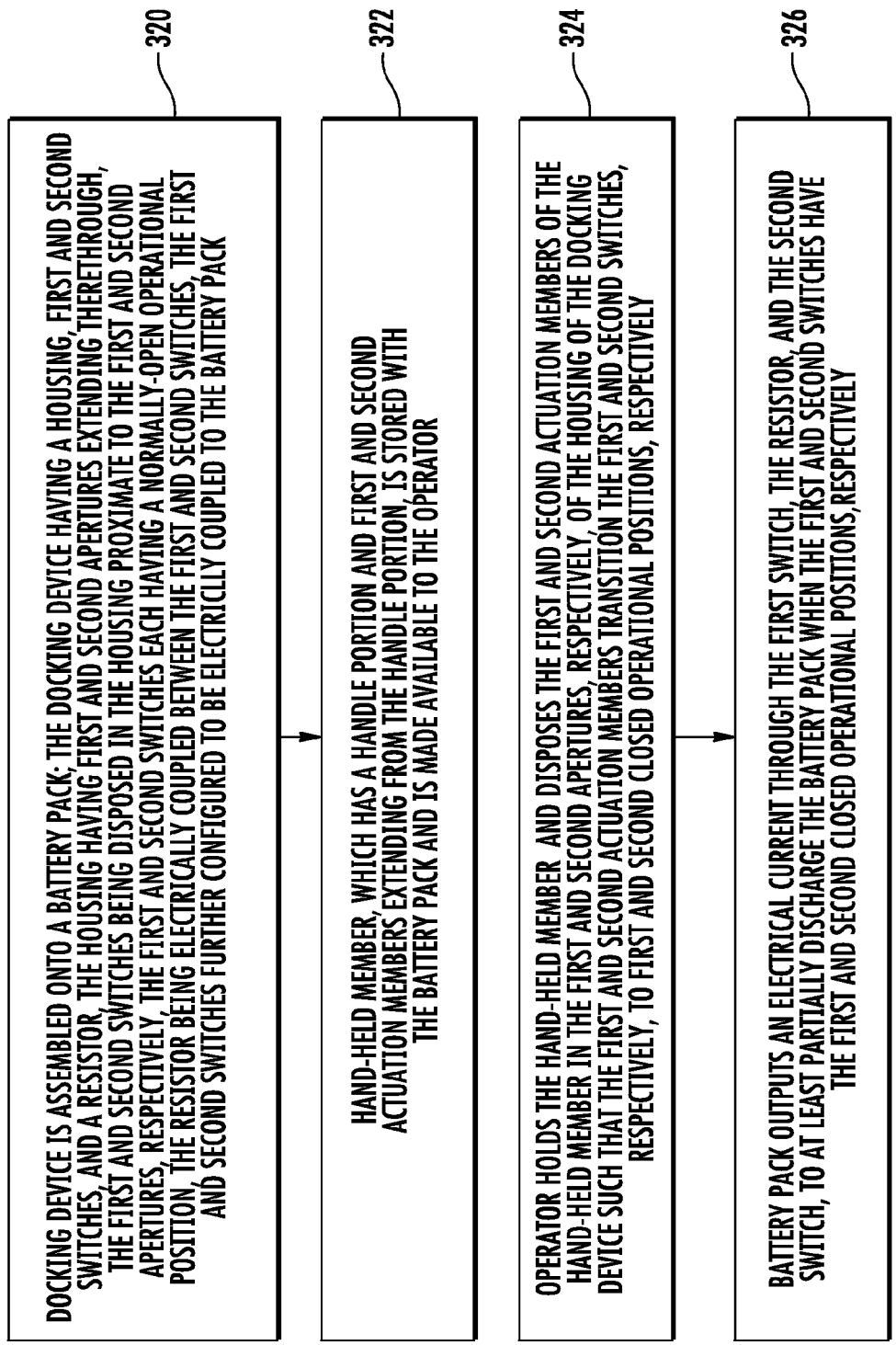
FIG. 15 is a flowchart of a method for discharging a battery pack in accordance with another exemplary embodiment.

Referring to FIGS. 1, 2 and 15, a method for discharging the battery pack 20 utilizing the battery pack discharging device 30 in accordance with another exemplary embodiment will now be explained.

At step 320, the docking device 70 is assembled onto the battery pack 20. The docking device 70 has the housing 140, switches 160, 170, and the resistor 180. The housing 140 has apertures 220, 230 extending therethrough. The switches 160, 170 are disposed in the housing 140 proximate to the apertures 220, 230, respectively. The switches 160, 170 each have a normally-open operational position. The resistor 180 is electrically coupled between the switches 160, 170. The switches 160, 170 are further configured to be electrically coupled to the battery pack 20.

At step 322, the hand-held member 60, which has the handle portion 80 and first and second actuation members 89, 104 extending from the handle portion 80, is stored with the battery pack 20 and is thus made available to an operator or to emergency personnel.

At step 324, the operator holds the hand-held member 60 and disposes the actuation members 89, 104 of the hand-held member 60 in the apertures 220, 230, respectively, of the housing 140 of the docking device 70 such that the actuation members 89, 104 transition the switches 160, 170, respectively, to first and second closed operational positions, respectively.

At step 326, the battery pack 20 outputs an electrical current through the switch 160, the resistor 180, and the switch 170, to at least partially discharge the battery pack 20 when the switches 160, 170 have the first and second closed operational positions, respectively.

Referring to FIG. 16, a portion of a battery pack discharging device 430 in accordance with another exemplary embodiment is illustrated. The battery pack discharging device 430 has a similar structure as the device 30, except that the device 430 does not utilize the normally-open switch 160 and the conductive plates 190, 192.

In particular, the device 430 utilizes one normally-open switch (i.e., switch 170) and conductive plates 440, 450. The normally-open switch 170 is electrically coupled to the electrical terminal 202. The switch 170 is further coupled to a first end of the resistor 180 utilizing the conductive plate 440. A second end of the resistor 180 is electrically coupled to the electrical terminal 200 utilizing the conductive plate 450. The device 434 further utilizes the hand-held member 60 discussed above, and the housing portion 150 discussed above which is coupled to the base plate 152. During operation, when the hand-held member 60 is inserted into the aperture 230, the switch 170 is transitioned to a closed operational position in an identical manner as discussed above for the device 30, to discharge the battery module.

The battery pack discharging device and the method for discharging a battery pack provide a substantial advantage over other devices and methods. In particular, the battery pack discharging device and the method provide a technical effect of allowing an operator to insert a hand-held member into a docking device to discharge the battery pack, regardless of an operational state of the internal contactors and/or a fuse within the battery pack.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack discharging device for discharging a battery pack, comprising:
    a hand-held member having a handle portion and first and second actuation members extending from the handle portion;
    a docking device having a housing, first and second switches, and a resistor, the housing having first and second apertures extending therethrough, the first and second switches being disposed in the housing proximate to the first and second apertures, respectively, the first and second switches each having a normally-open operational position, the resistor being electrically coupled between the first and second switches, the first and second switches further configured to be electrically coupled to the battery pack;
    the first and second actuation members of the hand-held member being configured to be disposed in the first and second apertures, respectively, of the housing of the docking device such that the first and second actuation members transition the first and second switches, respectively, to first and second closed operational positions, respectively; and
    the first switch having a first movable contact member and a first stationary contact member, and the housing having a first movable electrically non-conductive tab disposed proximate to the first aperture.

2. The battery pack discharging device of claim 1, wherein the first movable contact member having a first operational position in which the first movable contact member is not physically contacting the first stationary contact member, and a second operational position in which the first movable contact member is physically contacting the first stationary contact member, the first actuation member being configured to contact the first movable electrically non-conductive tab when the first actuation member is disposed in the first aperture such that the first movable electrically non-conductive tab moves the first movable contact member from the first operational position to the second operational position thereof to transition the first switch to the first closed operational position.

3. The battery pack discharging device of claim 1, further comprising first and second latching tabs extending from the first handle portion in a first direction and being disposed proximate to first and second sides of the first actuation member.

4. The battery pack discharging device of claim 3, wherein the first and second latching tabs are configured to engage first and second catching portions, respectively, of the housing of the docking device when the first actuation member is disposed in the first aperture to prevent the first actuation member from being removed from the first aperture.

5. The battery pack discharging device of claim 1, wherein the second switch comprises a second movable contact member and a second stationary contact member, and the housing having a second movable electrically non-conductive tab disposed proximate to the second aperture.

6. The battery pack discharging device of claim 5, wherein the second movable contact member having a first operational position in which the second movable contact member is not physically contacting the second stationary contact member, and a second operational position in which the second movable contact member is physically contacting the second stationary contact member, the second actuation member being configured to contact the second movable electrically non-conductive tab when the second actuation member is disposed in the second aperture such that the second movable electrically non-conductive tab moves the second movable contact member from the first operational position to the second operational position thereof to transition the second switch to the second closed operational position.

7. The battery pack discharging device of claim 5, further comprising a first latching tab extending from the first handle portion in a first direction and being disposed proximate to the second actuation member.

8. The battery pack discharging device of claim 7, wherein the first latching tab is configured to engage a first catching portion of the housing of the docking device when the second actuation member is disposed in the second aperture to prevent the second actuation member from being removed from the second aperture.

9. The battery pack discharging device of claim 1, wherein the battery pack outputs an electrical current through the first switch, the resistor, and the second switch, to at least partially discharge the battery pack when the first and second switches have the first and second closed operational positions, respectively.

10. The battery pack discharging device of claim 1, wherein the first aperture has a first cross-sectional shape, and the second aperture has a second cross-sectional shape, the first cross-sectional shape being different than the second cross-sectional shape.

11. The battery pack discharging device of claim 10, wherein the first actuation member is configured to be disposed through the first aperture having the first cross-sectional shape, and the first actuation member cannot be disposed through the second aperture having the second cross-sectional shape to contact a movable electrically non-conductive tab.

12. The battery pack discharging device of claim 11, wherein the second actuation member is configured to be disposed through the second aperture having the second cross-sectional shape, and the second actuation member cannot be disposed through the first aperture having the first cross-sectional shape to contact a movable electrically non-conductive tab.

13. The battery pack discharging device of claim 1, wherein the hand-held member is constructed of an electrically non-conductive material.

14. The battery pack discharging device of claim 13, wherein the electrically non-conductive material is plastic.

15. A method for discharging a battery pack, comprising:
    providing a battery pack discharging device having a hand-held member and a docking device; the hand-held member having a handle portion, first and second actuation members, and first and second latching tabs; the first and second actuation members extending from the handle portion; the first and second latching tabs extending from the handle portion and being disposed proximate to first and second sides of the first actuation member; the docking device having a housing, first and second switches, and a resistor, the housing having first and second apertures extending therethrough, the housing further having first and second catching portions therein, the first and second switches being disposed in the housing proximate to the first and second apertures, respectively, the first and second switches each having a normally-open operational position, the resistor being electrically coupled between the first and second switches, the first and second switches further configured to be electrically coupled to the battery pack; and disposing the first and second actuation members of the hand-held member in the first and second apertures, respectively, of the housing of the docking device such that the first and second actuation members transition the first and second switches, respectively, to first and second closed operational positions, respectively, and the first and second latching tabs engage the first and second catching portions, respectively, of the housing to prevent the first actuation member from being removed from the first aperture.

16. The method of claim 15, further comprising outputting an electrical current from the battery pack through the first switch, the resistor, and the second switch, to at least partially discharge the battery pack when the first and second switches have the first and second closed operational positions, respectively.

17. A battery pack discharging device for discharging a battery pack, comprising:

a hand-held member having a handle portion and an actuation member extending from the handle portion;

a docking device having a housing, a switch, and a resistor, the housing having an aperture extending therethrough, the switch being disposed in the housing proximate to the aperture, the switch having a normally-open operational position, the resistor being electrically coupled to the switch, the switch further configured to be electrically coupled to the battery pack;

the actuation member of the hand-held member being configured to be disposed in the aperture of the housing of the docking device such that the actuation member transitions the switch to a closed operational position; and the switch having a first movable contact member and a first stationary contact member, and the housing having a first movable electrically non-conductive tab disposed proximate to the aperture.

* * * * *